United States Patent [19]

Spence et al.

[11] Patent Number: 4,846,648
[45] Date of Patent: * Jul. 11, 1989

[54] TRIPLE-WALL FOAM COEXTRUSION APPARATUS

[75] Inventors: Steven E. Spence; Robert F. Shamet; Flavio Da Silva; Horst Eigruber, all of McPherson, Kans.

[73] Assignee: American Maplan Corporation, McPherson, Kans.

[*] Notice: The portion of the term of this patent subsequent to Mar. 15, 2005 has been disclaimed.

[21] Appl. No.: 139,958

[22] Filed: Dec. 31, 1987

Related U.S. Application Data

[63] Continuation-in-part of Ser. No. 932,636, Nov. 19, 1986, Pat. No. 4,731,002.

[51] Int. Cl.[4] .............................................. B29C 47/12
[52] U.S. Cl. .................................. 425/133.1; 264/45.9; 264/171; 425/380; 425/462
[58] Field of Search .................. 264/45.1, 45.8, 45.9, 264/171, 173; 425/112, 113, 114, 129 R, 130, 131.1, 133.1, 133.5, 190, 192 R, 376 R, 380, 376 A, 378 R, 379 R, 461, 462, 465, 817 C, 129.1, 376.1, 382.4, 378.1, 379.1

[56] References Cited

U.S. PATENT DOCUMENTS

| | | | |
|---|---|---|---|
| 3,266,093 | 8/1966 | Corbett | 425/133.1 |
| 3,933,960 | 1/1976 | Cameron et al. | 264/173 |
| 3,947,177 | 3/1976 | Eckardt | 264/45.1 |
| 3,963,403 | 12/1976 | Hughes | 425/462 |
| 3,966,861 | 6/1976 | Papesh et al. | 264/173 |
| 3,994,644 | 11/1976 | Hegler et al. | 425/112 |
| 4,054,403 | 10/1977 | Hornbeck | 425/133.1 |
| 4,061,461 | 12/1977 | Hessenthaler | 425/462 |
| 4,125,585 | 11/1978 | Rosenbaum | 264/173 |
| 4,208,175 | 6/1980 | Rosenbaum | 425/131.1 |
| 4,402,898 | 9/1983 | Rosenbaum | 425/133.1 |
| 4,465,449 | 8/1984 | Hornbeck | 425/131.1 |
| 4,731,002 | 3/1988 | Spence et al. | 425/133.1 |

FOREIGN PATENT DOCUMENTS

| | | | |
|---|---|---|---|
| 2528278 | 12/1976 | Fed. Rep. of Germany | 264/173 |
| 49-8029 | 2/1974 | Japan | 425/133.1 |
| 53-14105 | 5/1978 | Japan | 425/133.1 |
| 55-45711 | 1/1980 | Japan | 264/45.9 |
| 56-155749 | 12/1981 | Japan | 264/45.9 |

Primary Examiner—Jan H. Silbaugh
Assistant Examiner—Jill L. Heitbrink
Attorney, Agent, or Firm—Herbert Dubno

[57] ABSTRACT

A triple-wall foam coextrusion apparatus in which inner and outer layers of one synthetic resin material are coextruded with an intermediate layer of another synthetic resin material, and wherein the passages for the first material are inclined to the axis along which the second material is extruded around a spider to ensure uniform flow.

11 Claims, 2 Drawing Sheets

TRIPLE-WALL FOAM COEXTRUSION APPARATUS

CROSS REFERENCE TO RELATED APPLICATION

This application is a Continuation-In-Part of U.S. patent application Ser. No. 932,636, filed Nov. 19, 1986 and now U.S. Pat. No. 4,731,002.

FIELD OF THE INVENTION

The present invention relates to a triple-wall foam coextrusion apparatus and, more particularly to an extrusion head which is capable of extruding tubular elements in which a relatively thick intermediate layer is sandwiched between inner and outer layers of the same material, at least the intermediate layer being composed of a synthetic resin foam.

BACKGROUND OF THE INVENTION

It is already known to provide multilayer extrusion heads in which two or more layers or walls are extruded in a structure by passing the flow of one synthetic resin material through one passage and causing another synthetic resin material to flow codirectionally with the first flow, around the latter so as to meet it at a point in which the flows join to provide a multilayer structure. One such device is illustrated and described in U.S. Pat. No. 4,364,882. In that device, the flow from an extruder is passed axially and split into two generally annular streams which continue along separate paths until they meet a codirectionally moving stream from a second extruder which is forced into an annular passage between the first two streams.

When the streams meet, they form a triple-wall coextrusion which can be condensed in thickness, if desired, to emerge from the extrusion head as a tubular structure having inner and outer layers which derive from the synthetic resin material of the first extruder, and an intermediate layer sandwiched and bonded to the outer and inner layers, which derives from the second extruder.

Problems are encountered with such systems in part because the passage communicating with the intermediate annular passage is at right angles to the latter and to the axis of the extrusion head.

When a right-angle flow from a radial passage, for example into an annular passage is effected, the flow distribution tends to be irregular and such irregularities can result in a defect in the operation and in the product made.

OBJECTS OF THE INVENTION

It is, therefore, the principal object of the present invention to provide an improved triple-wall foam coextrusion apparatus whereby the drawbacks of this earlier system can be avoided.

Another object of the invention is to provide a coextrusion head for producing tubular bodies having an inner and outer layer sandwiching between them an intermediate layer of a material different from the inner and outer layers, which operates with greater regularity over longer periods to produce defect-free tubular products with high efficiency.

It is an another object of the invention to provide an improved apparatus for the purposes described which is easy to assemble and maintain.

It is still another object of the present invention to provide an improved apparatus for the purposes described to advance the principles of the related application in combination with newly discovered principles.

SUMMARY OF THE INVENTION

It has now been found that these objects can be attained by providing the outer annular passage and the central passage for the outer layer and the inner layer, respectively, so that they originate at a location downstream of the location at which an axial flow of the synthetic resin for the intermediate layer is caused to spread into an annular flow.

Specifically, therefore, it is possible to deliver the synthetic resin material for the outer and the inner layer through relatively short passages inclined at an angle to the axis of the head, preferably at an angle between 55° to 75° in the direction of flow of the several streams, from the point at which this synthetic resin is split into two streams.

In this apparatus, the extrusion head for the foamed intermediate layer communicates with an axial extending passage in which a spider is provided to spread the axial flow of this synthetic resin into an annular axial flow of this synthetic resin into an annular axial stream which meets the axial flows of the synthetic resin introduced at an acute angle to the axis of the apparatus from the other extruder.

The coextrusion apparatus can thus comprise:

a body formed with an intermediate axial passage communicating at one end with a source of a foamable synthetic resin adapted to form an intermediate wall of a triple wall coextrusion;

a spider in the intermediate passage formed with a central member extending along the intermediate passage and diverting a flow of the foamable synthetic resin around the spider, the spider having an inner passage with an upstream end coaxial with the intermediate passage and terminating in the intermediate passage at a downstream end of the central member and the inner passage;

means forming in the body an outer passage coaxial with the intermediate and inner passages and extending axially over part of the length of the member around the intermediate passage, the outer passage having a downstream end and an upstream end;

a feed fitting secured to the body and connected to a second source of synthetic resin adapted to form inner and outer walls of the coextrusion, the feed fitting being formed with an inlet channel including an acute angle with an axis of the body and the passages and converging toward the axis in a direction of flow of the synthetic resins, a first distribution channel diverging from the feed channel and opening into the upstream end of the inner passage, and a second distribution channel diverging from the feed channel and opening into the upstream end of the outer passage, both of the distribution channels being inclined to the axis at the acute angle where the distribution channels open into the inner and outer passages, respectively; and a cone of a pipe die positioned at the downstream end of the central body for deflecting outwardly an inner stream of synthetic resin from the inner passage to form an inner wall of the coextrusion, deflecting outwardly a stream of the foamable synthetic resin adapted to form the intermediate wall on the inner wall, and deflecting outwardly an outer stream of synthetic resin onto the intermediate wall to form an outer wall on the intermediate wall.

The foam PVC material forming the middle layer of the triple wall pipe undergoes an expansion which is much greater than that of the inner and outer layers of the pipe and constitutes after expansion 50% to 75% of the pipe material. In order to insure the proper expansion and bonding of the foam layer with the inner and outer layers, the extrusion head must be formed with restricted flow passages and precision angles for the proper flow and compression of the PVC foam, whereby the PVC foam after leaving the plasticizing extruder and entering the extrusion head in a compressed state is allowed to expand and decompress over a certain length of the flow passage, where the PVC foam is gradually once again compressed over a longer length of the flow passage to the exit, where it enters the die passages flanked by the inner and outer layers and is then expanded to the full pipe diameter.

BRIEF DESCRIPTION OF THE DRAWING

The above and other objects, features and advantages of the invention will become more apparent from the following description, reference being made to the accompanying drawing, in which.

SPECIFIC DESCRIPTION

Figure 1:
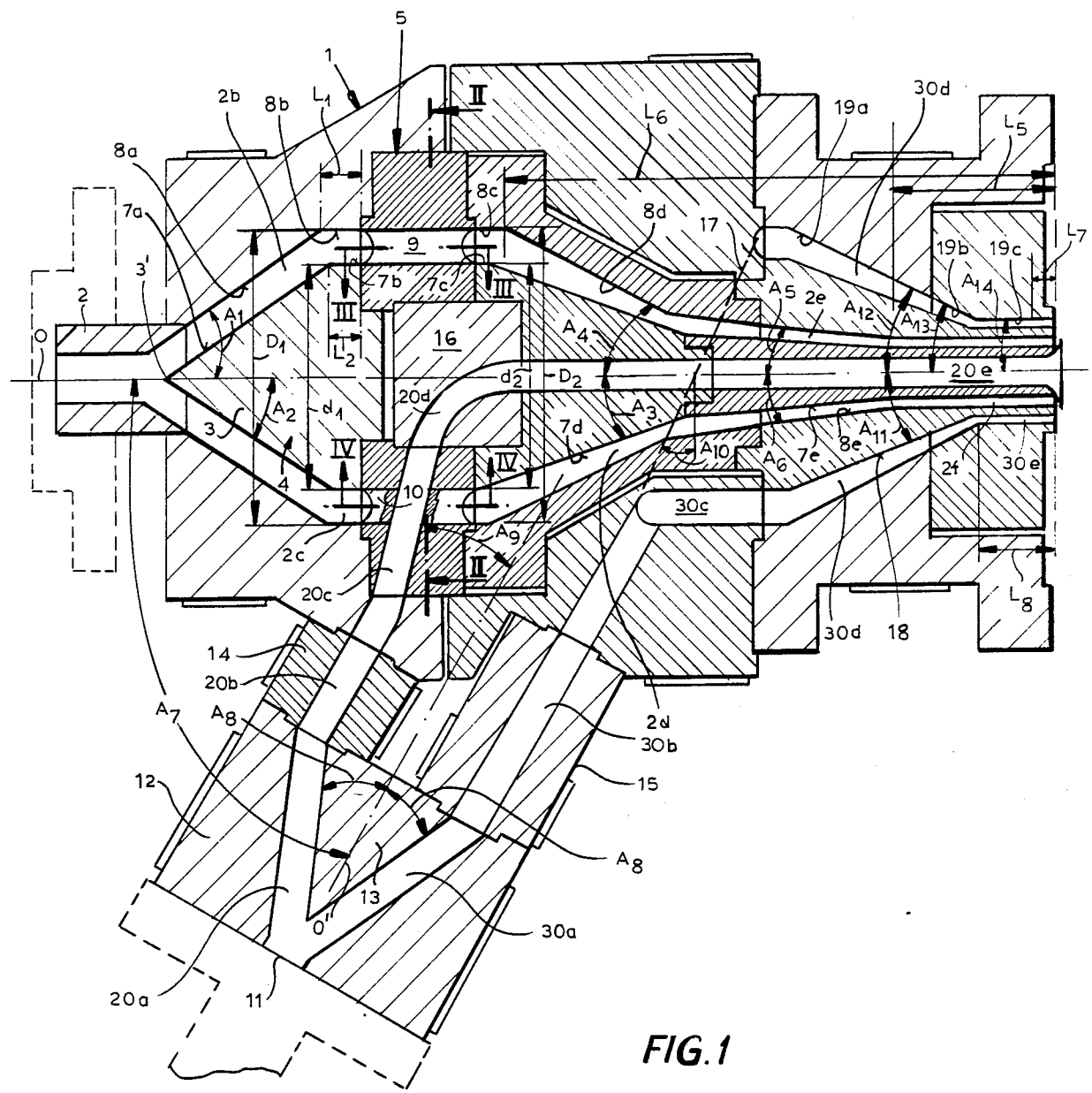
FIG. 1 is an axial sectional view through the extrusion body according to the invention.

An extrusion head 1 centered on a horizontal axis O is formed with three coaxial flow passages in the downstream die exit area of the head for extruding triple layer pipe in which the intermediate layer is an expanded PVC foam material and the inner and outer layers are a rigid PVC material.

A central passage 2a is formed in an insert 2 of the head 1 for a PVC foam from a plasticizing extruder not shown. The passage 2a is confronted with the apex 3' of a conical head 3 of a mandrel 4 coaxially disposed in the extrusion head 1 and supported therein by the webs of a spider 5. The conical head 3 divides the flow of PVC foam into a conical passage 2b, which is expanded in the downstream direction by the divergence of the wall 7a of the conical head 3 and the wall 8a of the extrusion head, the wall 7a forming an angle $A_2$ with the axis O of 25° to 42°, and the wall 8a forming an angle $A_1$ with the axis O of 32° to 45°, which will allow the PVC foam, which is to form the intermediate layer of the pipe, to expand and decompress. The outer conical wall 8a extends outwardly and rearwardly to blend with an annular wall 8b, having a diameter $D_1$ of 7.8" to 9.5", which extends for a length $L_1$ of 0.2" to 1.5" to the spider 5 and continues on the other side thereof as annular wall 8c having a diameter $D_2$ of 8" to 9". The inner conical wall 7a extends from the apex 3' outwardly and rearwardly to blend with an annular wall 7b having a diameter $d_1$ of 6" to 7.5", which extends for a length of $L_2$ of 0.2" to 1.2" to the spider 5 and continues on the other side thereof as annular wall 7c having a diameter $d_2$ of 5.5" to 7", the inner and outer annular walls 7b, 7c, and 8b, 8c forming with the spider an arc segmental passage 2c which can be cylindrical or slightly converging or diverging.

Figure 2:
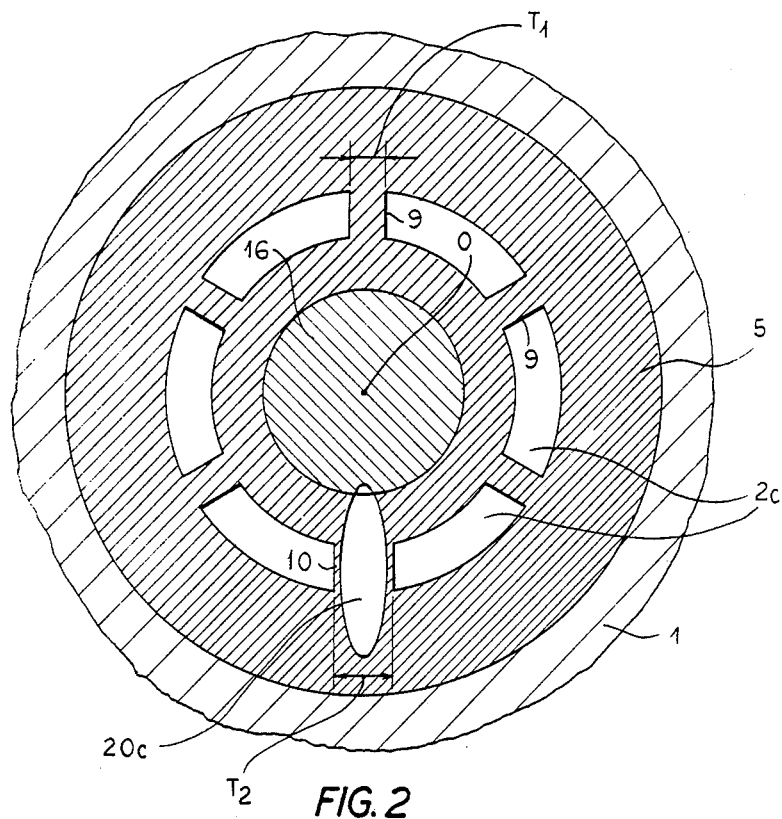
FIG. 2 is a cross sectional view taken along line II—II of FIG. 1.
Figure 3:
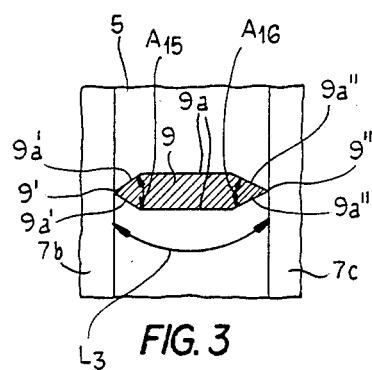
FIG. 3 is a sectional view taken along line III—III of FIG. 1.
Figure 4:
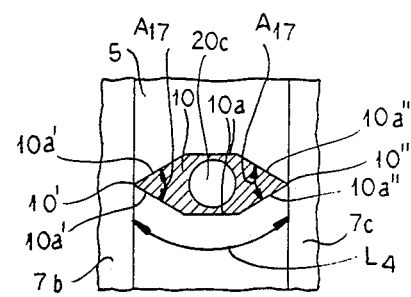
FIG. 4 is a sectional view taken along line IV—IV of FIG. 4.

The annular spider 5, as best seen in FIGS. 2–4, is formed with six webs spaced equally apart to withstand a great deal of pressure and support the cone of the mandrel 4 securely within the head 1. Five of the webs 9 are identical and are each formed with a leading knife edge 9' having beveled flanks 9a' forming between them an angle $A_{15}$ of 65° to 75°, and a trailing knife edge 9" having beveled flanks 9a" forming between them an angle $A_{16}$ of 45° to 56°, each web 9 having a thickness $T_1$ of 0.90" to 1.0" and a flow length $L_3$ measured along the walls 9a', 9a and 9a" of 0.60" to 1.30". The sixth web 10 is designed to allow a flow passage 20c for the PVC material forming the inner layer of the pipe to pass through it and as such, has a leading knife edge 10' and a trailing knife edge 10" having respective beveled flanks 10a' and 10a" forming between the same angle of $A_{17}$ 52° to 68°, the web 10 having a thickness $T_2$ of 1.00" to 2.00" and a flow length $L_4$ measured along the walls 10a', 10a and 10a" of 1.30" to 1.90". All of the spider webs 9 and 10 are designed with the proper leading and trailing edge angles and thicknesses to produce a smooth material separation and gradual bringing together of the foam without causing temperature changes or dragging, which could cause pipe tearing, visible lines or even extra back pressure and material burning.

To obtain a superior quality triple wall pipe, each layer of material must have a high but controlled output rate. This is achieved by producing a compression ratio range defined, for instance, by the relationship of the spider outlet cross sectional area and the cross sectional area of the head or die exit 2f, or for the outer pipe layer, the cross sectional area of the annular passage 30c and the cross sectional area of the head exit 30e. The spider outlet area is 20 sq. inches to 30 sq. inches which produces a compression ratio of 11:1 to 35:1, which is identical to the compression ratio between the annular chamber 30c and head outlet 30e.

Downstream of the spider 5, the annular passage 2c becomes a conical passage 2d which narrows in the downstream direction by the convergence of the inner mandrel wall 7d and the outer extrusion head wall 8d, the wall 7d forming an angle $A_3$ with the axis O of 15° to 26°, and the wall 8d forming an angle $A_4$ with the axis O of 20° to 32°, this convergence can compressing the foam until the proper compression ratio and foam volume is obtained. Still further downstream, the conical passage 2d becomes a more nearly horizontal conical passage 2e which narrows in the downstream direction by the convergence of the inner mandrel wall 7e and outer extrusion head wall 8e, the wall 7e forming an angle $A_5$ with the axis O of 1° to 9°, and the wall 8e forming an angle $A_6$ with the axis O of 17° to 30°, the configuration of the four angles $A_3$, $A_4$, $A_5$ continuously compressing the foam until the proper compression ratio is obtained, which is reached in the die area where the passages all run horizontal and parallel and define the land length. Again, these angles will prevent turbulence and burning.

Downstream of the conical passage 2e, the passage 2f becomes cylindrical and enters what is considered the die area or land length, in which the PVC foam layer runs parallel between the inner and outer layers of the pipe. The land length for the foam material must be a specific length to allow for proper material plasticizing, stabilizing and controlling of back pressure. The proper length is defined as the given cylindrical area corresponding to the die exit diameter. In this case, the land length $L_5$ of passage 2f is 2.00″ to 10.00″ long. Also, in conjunction with the calculated length, the location of the land length is such that its exit point is in proper alignment with the respective exit points of the inner and outer layers.

The PVC material which is to form the rigid inner and outer layers of the pipe is plasticized in a suitable extruder (not shown) and passed through an inlet 11 into a Y-block 12 centered on an axis O' inclined to the axis O to feed in the downstream direction at an angle $A_7$ of 55° to 75°. A wedge 13 formed in the Y-block divides the incoming flow into two passages 20a and 30a, each forming an angle $A_8$ with the axis O' of 20° to 30°, which allows no disturbances in the flow, yet allowing the Y-block 12 to be formed in one piece.

Each passage 20a and 30a is joined by a respective insert 14 and 15, having a respective passage 20b and 30b, to the body of the extrusion head 1, each insert being designed to separately control the output rate of their respective pipe layers as required. The inserts 14 and 15 also control proper melting conditions and back pressure in the extruder.

Downstream of the insert 14, the flow passage 20b, which carries the pipe's inner layer of PVC material, becomes passage 20c which extends through the spider 5 and the web 10 thereof at an angle $A_9$ of 10° to 18° with the axis O'. The angle $A_9$ is such that the passage 20c passes directly through the center of the web 10 from the insert 14 to the next mating part, the spider insert 16. The mating of the parts 1, 5 and 16 requires extremely tight tolerances in the angle alignments during the assembly of the extrusion head.

The spider insert 16 is designed to allow the proper turning angle conversion from the passage 20c to the the central outlet passage 20e without turbulence, burns or back pressure build-up of the PVC material and is formed with an arcuate passage 20d, the central passage 20e maintaining the proper compression and residence time of the material. In order to do this, the flow area of the passage 20e must be 0.50 sq. inches to 1.20 sq. inches and have a land length $L_6$ of 12.00″ to 20.00″. The passage 20e is also designed so that the exit point is in alignment with the other flow passage's exit points.

Downstream of the insert 15, the flow passage 30b, which carries the pipe's outer layer of PVC material, becomes annular chamber 30c formed in extrusion head 1 and centered on axis O and having a back wall 17 inclined to a perpendicular to the axis O at an angle $A_{10}$ of 19° to 27°. The annular chamber 30c acts to distribute the flow of PVC material from the tubular passage 30b into an annular flow. Downstream of the annular chamber 30c, the passage 30d becomes conical and narrows in the downstream direction by the convergence of the inner wall 18 and the outer wall 19a, the wall 18 forming an angle $A_{11}$ with the axis O of 15° to 26°, and the outer wall 19a forming an angle $A_{12}$ with the axis O of 20° to 35°, this decrease in volume of the passage 30d acting to distribute the output rate evenly throughout the chamber and passage as the material leaves the extrusion head. However, to further even out PVC flow in the land area and provide the proper distribution and residence time, the outer wall along an upper portion 19b and 19c of the passage 30d bends through two more angles, namely angle $A_{13}$ of wall portion 19b at 17° to 30° to the axis O, and angle $A_{14}$ of wall portion 19c at 5° to 16° to the axis O, leaving the upper wall portion of passage 30e with a land length $L_7$ of 1.00″ to 5.00″, while the lower wall portion 19a continues to the passage 30e at which a land length $L_8$ of 2.50″ to 7.00″ is formed.

At the exit point of the passages, all three PVC layers bond together entering the pipe die which has not been illustrated. Each layer has a specified percent of material thickness at this point. The outer layer has 15% to 20%, the inner layer has 18% to 30%, and the intermediate layer has 50% to 75% of the required pipe material. These wall thicknesses are controlled separately by the inserts 2, 14 and 15, which compress and control the flow as needed for each layer in the die or land area. All of the flow passages in this area run parallel to each other stabilizing the material at their proper percentage of thickness.

We claim:

1. A triple-wall foam coextrusion apparatus, comprising:

an extrusion body centered on a horizontal axis and formed with an elongated central passage communicating at an upstream end with a source of foamable synthetic resin;

an elongated central member coaxially disposed in said central passage and extending the length thereof for diverting a flow of said foamable synthetic resin, said central member adapted to form with said central passage an intermediate wall of a triple wall coextrusion, said central member having an upstream end forming with said central passage a first diverging conical intermediate wall passage widening in a downstream direction for enabling the flow of said foamable synthetic resin to expand and decompress, said first intermediate wall passage communicating with a second intermediate wall passage immediately downstream thereof and divided axially into a plurality of arc segments by a plurality of webs of a spider disposed in said central passage for supporting said central member, said second intermediate wall passage flanking said spider at upstream and downstream sides thereof with respective upstream and downstream annular portions formed between said central member and said central passage, said second intermediate wall passage communicating with a third converging conical intermediate wall passage immediately downstream thereof formed between said central member and said central passage and narrowing the downstream direction for compressing the flow of said foamable synthetic resin, said third intermediate wall passage communicating with a fourth converging conical intermediate wall passage immediately downstream thereof formed between said central member and said central passage and narrowing the downstream direction for further compressing the flow of said foamable synthetic resin to obtain a first compression ratio between said second intermediate wall passage and said fourth intermediate wall passage, said fourth intermediate wall passage communicating with a fifth cylindrical intermediate wall passage formed between a downstream end of said central member and said central passage and defining a first land portion for proper plasticizing, stabilizing and controlling of back pressure the flow of said foamable synthetic resin;

a cylindrical inner wall channel formed in said central member and defining a second land coaxial with said first land, said inner wall channel communicating with a first feed channel inclined at least in part at an acute angle to said axis and connected at an upstream end to a second source of synthetic resin for supplying an inner flow of said synthetic resin adapted to form an inner wall of said coextrusion to said second land; and a cylindrical outer wall channel formed in said extrusion body outwardly of said intermediate wall passage and defining a third land coaxial with said first and second lands, said outer wall channel communicating with a second feed channel inclined at least in part at said acute angle to said axis and connected at an upstream end to said second source for supplying an outer flow of said synthetic resin adapted to form an outer wall of said coextrusion to said third land.

2. The coextrusion apparatus defined in claim 1 wherein said first and second feed channels are formed in a feed fitting provided on said body and centered on a second axis inclined at said acute angle to said first mentioned axis, said first and second feed channels being connected to said second source by a Y-shaped convergence of said first and second feed channels formed in said feed fitting and centered on said second axis.

3. The coextrusion apparatus defined in claim 2 wherein said acute angle is in the range of 55° to 75° with a vertex in the direction of flow through the apparatus.

4. The coextrusion apparatus defined in claim 2 wherein a portion of said first feed channel forms an angle with said second axis of 10° to 18° with a vertex opposite the direction of flow through the apparatus, whereby said portion of said first feed channel passes through said spider at a center of one of said webs upstream of said inner wall channel, whereby said second land thereof has a length in the range of 12 to 20 inches.

5. The coextrusion apparatus defined in claim 2 wherein said second feed channel communicates with said outer wall channel at a coaxial annular chamber forming a part thereof and having a back wall forming an angle with a perpendicular to said first axis in the range of 19° to 27° with a vertex in the direction of flow through the apparatus, said annular chamber communicating with a converging conical portion of said outer wall channel immediately downstream thereof and formed between an inner conical surface at an angle with said first axis in the range of 15° to 26° with a vertex in the direction of flow through the apparatus and an outer conical wall at an angle with said first axis in the range of 20° to 35° with a vertex in the direction of of flow through the apparatus, whereby said converging conical portion narrows in a downstream direction establishing a second compression ratio between said chamber and said land in the range of 11:1 to 35:1 and at least a circumferential portion of said third land has a length in the range of 2.5 to 7 inches.

6. The coextrusion apparatus defined in claim 2 wherein said Y-shaped convergence includes an angle in the range of 40° to 60° with a vertex opposite the direction of flow through the apparatus.

7. The coextrusion apparatus defined in claim 1 wherein said upstream end of said central member has a first diverging conical surface forming an angle with said axis in the range of 25° to 42° with a vertex opposite the direction of flow through the apparatus and forming with a second diverging conical surface of said central passage having an angle with the axis in the range of 32° to 45° with a vertex opposite the direction of flow through the apparatus said first diverging conical intermediate wall passage.

8. The coextrusion apparatus defined in claim 1 wherein said upstream annular portion of said second intermediate wall passage is formed between a third annular upstream surface of said central member having a diameter in the range of 6 to 7.5 inches and an axial length in the range of 0.2 to 1.2 inches and a fourth annular upstream surface of said central passage having a diameter in the range of 7.8 to 9.5 inches and an axial length in the range of 0.2 to 1.5 inches, and said downstream annular portion of said second intermediate wall passage is formed between a fifth annular downstream surface of said central member having a diameter in the range of 5.5 to 7 inches and a sixth annular downstream surface of said central passage having a diameter in the range of 8 to 9 inches, the diameters of said third and fifth upstream and downstream surfaces respectively of said central member being preferably the same and the diameters of said fourth and sixth upstream and downstream surfaces respectively of said central passage being preferably the same and having a cross sectional area in the range of 20 to 30 sq. inches.

9. The coextrusion apparatus defined in claim 1 wherein said third converging conical intermediate wall passage is formed between a seventh converging conical surface of said central member forming an angle with said axis in the range of 15° to 26° with a vertex in the direction of flow through the apparatus, and an eighth converging conical surface of said central passage forming an angle with said axis in the range of 20° to 32° with a vertex in the direction of flow through the apparatus.

10. The coextrusion apparatus defined in claim 1 wherein said fourth converging conical intermediate wall passage is formed between a ninth converging conical surface of said central member forming an angle with said axis in the range of 1° to 9°, and a tenth converging conical surface of said central passage forming an angle with said axis in the range of 17° to 30°, whereby said first compression ratio is in the range of 11:1 to 35:1 and said first land has a length in the range of 2 to 10 inches.

11. The coextrusion apparatus defined in claim 4 wherein said one of said webs of said spider through which said first feed channel passes is formed with a leading and trailing knife edge each formed with respective pairs of beveled flanks forming between them an angle in the range of 52° to 68°, said one web having a thickness of 1 to 2 inches and a flow length of 1.3 to 1.9 inches, remaining webs of said spider each formed with a respective leading knife edge having a pair of beveled flanks forming an angle between them in the range of 65° to 75° and respective trailing knife edges each formed with respective pairs of beveled flanks forming an angle between them in the range of 45° to 56°, said remaining webs each having a thickness of 0.9 to 1 inches and a flow length of 0.6 to 1.3 inches.

* * * * *